United States Patent [19]

Sano et al.

[11] Patent Number: 5,407,334
[45] Date of Patent: Apr. 18, 1995

[54] SCROLL TYPE COMPRESSOR HAVING A CONVEX SURFACE ON THE SUB FRAME BUSHING

[75] Inventors: Fumiaki Sano; Masahiko Oide; Toshiyuki Nakamura; Hiroshi Ogawa; Norihide Kobayashi; Yoshinori Shirafuji; Takashi Yamamoto; Keiji Sakaino, all of Shizuoka, Japan

[73] Assignee: Mitsubishi Denki Kabushiki Kaisha, Tokyo, Japan

[21] Appl. No.: 175,125

[22] Filed: Dec. 29, 1993

Related U.S. Application Data

[62] Division of Ser. No. 43,806, Apr. 7, 1993, Pat. No. 5,312,229, which is a division of Ser. No. 834,220, Feb. 12, 1992, Pat. No. 5,222,881.

[30] Foreign Application Priority Data

Mar. 4, 1991 [JP] Japan ................................ 3-37055
Aug. 27, 1991 [JP] Japan ................................ 3-214997

[51] Int. Cl.6 .................... F04C 18/04; F04C 29/00; F16C 23/04
[52] U.S. Cl. .................... 418/55.1; 418/55.5; 418/57; 418/182; 384/192; 403/121; 464/106
[58] Field of Search ............ 418/55.1, 55.5, 57, 418/182; 464/106; 403/121; 384/192, 193

[56] References Cited

U.S. PATENT DOCUMENTS

| | | | |
|---|---|---|---|
| 4,808,094 | 2/1989 | Sugimoto et al. | 418/182 |
| 5,137,437 | 8/1992 | Machida et al. | 418/55.1 |
| 5,186,546 | 2/1993 | Abe | 418/55.5 |

FOREIGN PATENT DOCUMENTS

| | | | |
|---|---|---|---|
| 107213 | 9/1927 | Austria | 384/192 |
| 1170779 | 7/1989 | Japan | 418/55.1 |

Primary Examiner—John J. Vrablik
Attorney, Agent, or Firm—Oblon, Spivak, McClelland, Maier, & Neustadt

[57] ABSTRACT

A scroll type compressor having a main frame, a sub frame and a crankshaft rotatably mounted in the main frame and the sub frame via a main frame bushing and a sub frame bushing, further includes a fixed scroll and an orbiting scroll cooperable with the fixed scroll to compress gas, the orbiting scroll being drivingly mounted on the eccentric shaft portion. A barrel shaped band portion faces the crankshaft and presents a convex surface in at least one of a respective force direction of a compressive load generated in a compression chamber formed between the orbiting scroll and the fixed scroll, and a reactive force direction of a centrifugal load generated by a revolution movement of the orbiting scroll and rotary movements of upper and lower balance weights. The barrel shaped band portion is formed on the sub frame bushing.

1 Claim, 11 Drawing Sheets

SCROLL TYPE COMPRESSOR HAVING A CONVEX SURFACE ON THE SUB FRAME BUSHING

This is a division of application Ser. No. 08/043,806, filed on Apr. 7, 1993, U.S. Pat. No. 5,312,229 which is a division of appl. Ser. No. 07/834,220, filed on Feb. 12, 1992, U.S. Pat. No. 5,222,881.

BACKGROUND OF THE INVENTION

The present invention relates to a scroll type compressor, and more particularly to a scroll type compressor which is utilized in refrigeration and air conditioning systems.

A conventional scroll type compressor, which has been disclosed in e.g. Japanese Unexamined Patent Publication No. 80088/1988, is constructed as shown in FIG. 17. In FIG. 17, reference numeral 1 designates a fixed scroll. Reference numeral 2 designates an orbiting scroll. Reference numeral 3 designates a crankshaft. Reference numeral 4 designates a driving bushing which is rotatably mounted in a bearing part 2a formed in the orbiting scroll 2. Reference numeral 5 designates an Oldham's ring. Reference numeral 6 designates a main frame. Reference numeral 6a designates a main bearing which is formed in the main frame 6. Reference numeral 7 designates an electric motor stator. Reference numeral 8 designates an electric motor rotor. Reference numeral 9 designates a sub frame. Reference numeral 9a designates a sub bearing which is formed in the sub frame 9. Reference numeral 10 a hermetic shell. Reference numeral 11 designates an intake tube which directs a refrigerant from outside. Reference numeral 12 designates a discharge tube. Reference numeral 13 designates a lubricating oil which is stored in a bottom part of the hermetic shell. The crankshaft 3 has an eccentric shaft portion 3a formed at an upper portion. The eccentric shaft portion 3a is fitted into the bearing part 2a through the driving bushing 4, the bearing part 2a being formed on a base plate undersurface of the orbiting scroll 2. The crankshaft 3 has a main shaft portion 3b and a sub frame shaft portion 3c formed on its upper end and lower end, respectively, so that the main shaft portion 3b is supported by the main bearing 6a of the main frame 6 and the sub shaft part 3c is supported by the sub bearing 9a of the sub frame 9. Reference numerals 14 and 15 designate an upper balance weight and a lower balance weight, respectively, which are attached on the opposite sides (in the vertical direction) of the electric motor rotor 8.

Now, the operation of the conventional scroll type compressor of FIG. 17 will be explained. Torque which is generated by the electric motor is transmitted by the crankshaft 3 which is shrinkage fitted into the rotor 8. The torque is further transmitted to the orbiting scroll 2 through the eccentric shaft portion 3a and the driving bushing 4. The Oldham's ring 5 which works as a rotation preventing mechanism causes the orbiting scroll 2 to carry out such a revolution movement that the orbiting scroll moves along a circular orbit. The revolution movement changes the volume of a compression chamber formed between the fixed scroll 1 and the orbiting scroll 2 to compress the refrigerant.

The refrigerant enters the hermetic shell 10 from an outer refrigeration cycle through the intake tube 11. The refrigerant is compressed in the compression chamber to have a high pressure, and then flows out in the outer refrigeration cycle through the discharge tube 12. By the way, a thrust direction force of compressive loads of the refrigerant which are applied to the orbiting scroll 2 is supported by a thrust bearing surface 6b on an upper end surface of the main frame 6. On the other hand, a radial direction force $F_g$ of the compressive loads is transmitted to the crankshaft 3 through the driving bushing 4 as shown in FIG. 18. The crankshaft 3 is supported by the main bearing 6a formed in a lower boss of the main frame 6, and by the sub bearing 9a formed in the sub frame 9.

The upper balance weight 14 and the lower balance weight 15 which are mounted on the opposite ends of the rotor 8 are arranged to be balanced against a centrifugal force $F_{C1}$ which is generated by the revolution movement of the orbiting scroll 2. Centrifugal forces $F_{C2}$ and $F_{C3}$ which are generated by the upper balance weight 14 and the lower balance weight 15 are also supported by the main bearing 6a and the sub bearing 9a. The lubricating oil 13 which is stored in the bottom part of the hermetic shell 10 is fed to sliding parts such as the bearing parts and the compression chamber by a centrifugal force caused by the rotation of the crankshaft 3.

In the conventional scroll type compressor, the radial direction force $F_g$ which is applied to the orbiting scroll in the compression stroke is exerted on the eccentric shaft portion 3a which is at the upper end of the crankshaft 3, as explained. However, because the eccentric shaft portion 3a as the exerting point projects from the main bearing 6a of the main frame 6 in the direction remote from the bearing 9a, the compressive load $F_g$ causes the crankshaft 3 to be flexture-deformed as shown in FIG. 19. When the crankshaft 3 is flexture-deformed, the eccentric shaft portion 3a is inclined in the bearing part 2a of the orbiting scroll 2, the main shaft portion 3b is inclined in the main bearing 6a of the main frame 6, or the sub shaft part 3c is inclined in the sub bearing 9a of the sub frame 9. This creates e.g. a problem in that load carrying capacities of the respective bearing parts can deteriorate to wear or seize the bearing parts.

In particular, recently, the application of a variable speed operation to a compressor under an inverter control is accompanied by extension of the operating range of the compressor from a low speed to a high speed in e.g. air conditioning systems. In a low speed operating area, an oil film is difficult to be formed in the bearings. In a high speed operating area, the centrifugal forces $F_{C1}$, $F_{C2}$ and $F_{C3}$ which are generated by the orbiting scroll 2, the upper balance weight 14 and the lower balance weight 15 are increased to further enlarge the flexture-deformation of the crankshaft 3, making the problem more noticeable, which is demanded to be solved.

SUMMARY OF THE INVENTION

It is an object of the present invention to solve the problem, and to provide a highly reliable scroll type compressor capable of preventing a bearing part from being damaged due to wear, seize or the like even if a crankshaft is flexture-deformed by a radial direction force in compressive loads which are exerted to an orbiting scroll during a compression stroke.

According to a first aspect of the present invention, there is provided a scroll type compressor comprising a crankshaft having an eccentric shaft portion formed thereon; an orbiting scroll which is given torque by the crankshaft through the eccentric shaft portion; and bearing means for rotatably supporting the crankshaft; wherein at least one of the eccentric shaft portion and the bearing means is constituted by a rotatably engaged bushing and a curved surface portion.

According to a second aspect of the present invention, there is provided a scroll type compressor comprising a crankshaft having an eccentric shaft portion formed thereon; an orbiting scroll which is given torque by the crankshaft through the eccentric shaft portion, the bearing means comprising bearing devices which are provided in a main frame and a sub frame to support the crankshaft at its main shaft portion and sub shaft portion.

In the second aspect, it is advisable that the scroll type compressor further comprises an electric motor rotor arranged at an intermediate position in an axial direction; and an upper balance weight and a lower balance weight placed on the opposite ends of the rotor to be balanced against a centrifugal force which is generated by an orbiting movement of the orbiting scroll; wherein in order to prevent partial contact from bringing about due to flexture-deformation of the crankshaft in the bearing devices, at least one of the main shaft portion and the sub shaft portion has a central portion provided with a barrel shaped band portion to present a convex surface in the entire peripheral direction, the band portion has a peripheral portion engaged with the bushing through a minute gap, and the bushing is coupled to the crankshaft by a pin in terms of a rotational direction.

In the second aspect, it is also advisable that the scroll type compressor further comprises an electric motor rotor arranged at an intermediate position in an axial direction; and an upper balance weight and a lower balance weight placed on the opposite ends of the rotor to be balanced against a centrifugal force which is generated by an orbiting movement of the orbiting scroll; wherein in order to prevent partial contact from bringing about due to flexture-deformation of the crankshaft in the bearing devices, the main shaft portion has a central portion provided with a barrel shaped band portion to present a convex surface in at least one of a reactive force direction of a compressive load generated in a compression chamber formed between the orbiting scroll and the fixed scroll, and a reactive force direction of a centrifugal load generated by a revolution movement of the orbiting scroll and rotary movements of the upper and lower balance weights, and the main shaft portion is engaged with a cylindrical bushing through a minute gap.

In the first aspect, it is advisable that the scroll type compressor further comprises an electric motor rotor arranged at an intermediate position in an axial direction; and the bushing engaged with the eccentric shaft portion and rotatably mounted in a bearing part of the orbiting scroll; wherein in order to prevent partial contact from arising due to flexture-deformation of the crankshaft in the bearing part, two couples of oppositely engaged surface portions are formed on the eccentric shaft portion and the bushing, one of the couples are constituted by flat surfaces, either of the oppositely engaged surface portions in the other couple is constituted by a curved surface which is curved along an axial direction, and the other engaged surface portion is constituted by a flat surface.

It is further advisable that the scroll type compressor further comprises an upper balance weight and a lower balance weight placed on the opposite ends of the rotor to be balanced against a centrifugal force which is generated by an orbiting movement of the orbiting scroll; and the bearing means comprising bearing devices which are provided in a main frame and a sub frame to support the crankshaft at its main shaft portion and sub shaft portion; wherein in order to prevent partial contact from bringing about due to flexture-deformation of the crankshaft in the bearing parts for supporting the main shaft and sub shaft portions of the crankshaft, at least one of the main shaft portion and the sub shaft portion has a central portion provided with a barrel shaped band portion to present a convex surface in the entire peripheral direction, the band portion has a peripheral portion engaged with the bushing through a minute gap.

It is still further advisable that the scroll type compressor comprises an upper balance weight and a lower balance weight placed on the opposite ends of the rotor to be balanced against a centrifugal force which is generated by an orbiting movement of the orbiting scroll; and the bearing means comprising bearing devices which are provided in a main frame and a sub frame to support the crankshaft at its main shaft portion and sub shaft portion; wherein in order to prevent partial contact from bringing about due to flexture-deformation of the crankshaft in the bearing devices, the main shaft portion has a central portion provided with a barrel shaped band portion to present a convex surface in the entire peripheral direction, the band portion has a peripheral portion engaged with the bushing through a minute gap, and the bushing is coupled to the crankshaft by a pin in terms of a rotational direction; and wherein the bearing device for supporting the sub shaft portion of the crankshaft is constructed by a rolling bearing to prevent partial contact from bringing about in the bearing device due to flexture-deformation of the crankshaft.

In the first aspect, it is advisable that the scroll type compressor further comprises the bushing engaged with the eccentric shaft portion and rotatable mounted in the orbiting scroll; wherein the eccentric shaft portion has a flat surface formed on a part of its peripheral surface, and a curved surface formed on a location at the side opposite to the flat surface to be curved along an axial direction, the bushing has an inner peripheral surface engageable with the eccentric shaft portion, and the inner peripheral surface has flat surfaces formed on locations corresponding to the flat surface and the curved surface.

In the first aspect, it is also advisable that the scroll type compressor further comprises the bushing engaged with the eccentric shaft portion and rotatably mounted in the orbiting scroll; wherein the eccentric shaft portion has two flat surfaces formed on its peripheral surface at opposite sides with respect to the center thereof, the driving bushing has an inner peripheral surface engageable with the eccentric shaft portion, the inner peripheral surface has a flat surface formed thereon at a location corresponding to one of the eccentric shaft portion flat surfaces and a curved surface formed thereon at a location corresponding to the other eccentric shaft portion flat surface, the curved surface being curved along an axial direction.

In the first aspect, it is further advisable that the scroll type compressor further comprises the bushing engaged with the eccentric shaft portion and rotatably mounted in the orbiting scroll; wherein the eccentric shaft portion has a flat surface formed on a part of its peripheral surface, and a curved surface formed on a location at the side opposite to the flat surface to be curved along an axial direction, the bushing has an inner peripheral surface engageable with the eccentric shaft portion, and the inner peripheral surface has a curved surface formed thereon at a location corresponding to the eccentric shaft portion curved surface and a flat surface formed thereon at a location corresponding to the eccentric shaft portion flat surface.

In the scroll type compressor according to the present invention, a radial direction force is exerted on the orbiting scroll during a compression stroke, and the force is applied to the eccentric shaft portion which is provided on top of the crankshaft. As a result, the crankshaft is subject to flexure-deformation. In accordance with the present invention, the scroll type compressor is provided with such bearing means that the eccentric shaft portion, the main shaft portion or the sub shaft portion of the crankshaft has a curved surface, or has a central portion provided with a barrel shaped band portion to present a convex surface in the entire peripheral direction. The curved surface or the band portion allows a driving bushing or a cylindrical bushing to be in touch with the curved surface or the barrel shaped surface so as to be axially rotatable and movable. Such an arrangement can drive the crankshaft in a parallel state with respect to each bearing. As a result, partial contact can be prevented from bringing about in each bearing, thereby avoiding occurrence of wear and seize. In addition, a bearing load capacity can be prevented from deteriorating, providing a highly reliable scroll type compressor capable of preventing a bearing from being damaged.

DETAILED DESCRIPTION OF THE PREFERRED EMBODIMENTS

Figure 1:
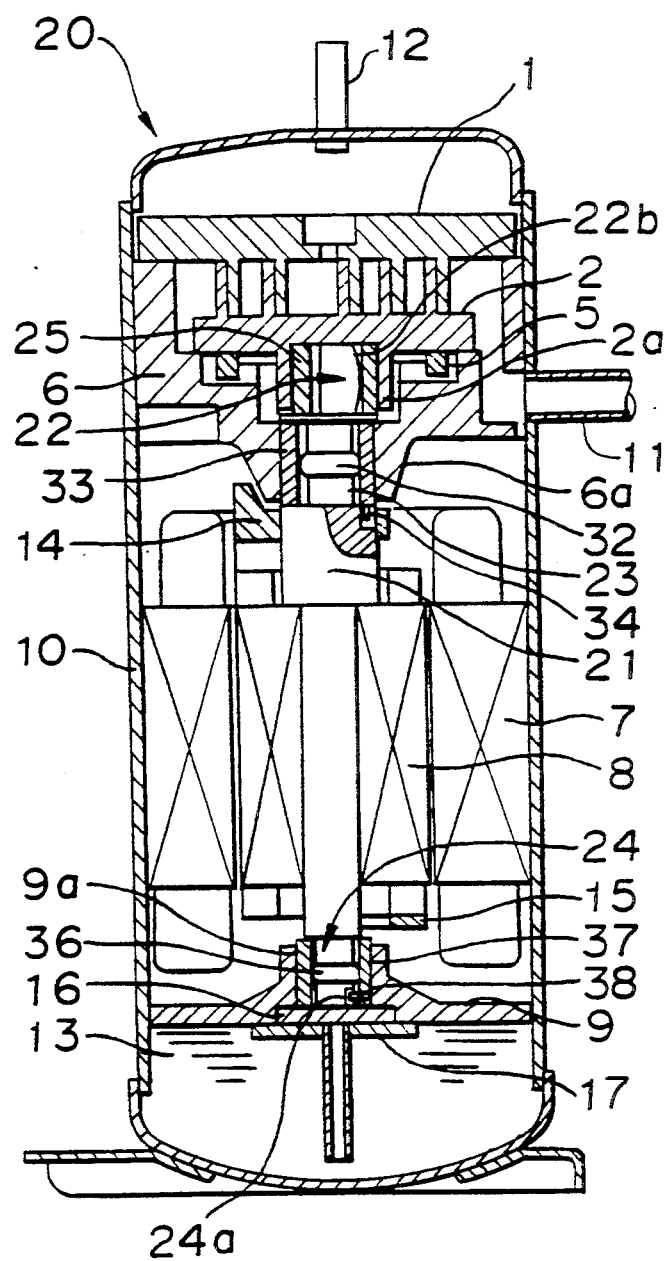
FIG. 1 is a longitudinal sectional view showing a first embodiment of a scroll type compressor according to the present invention.
Figure 17:
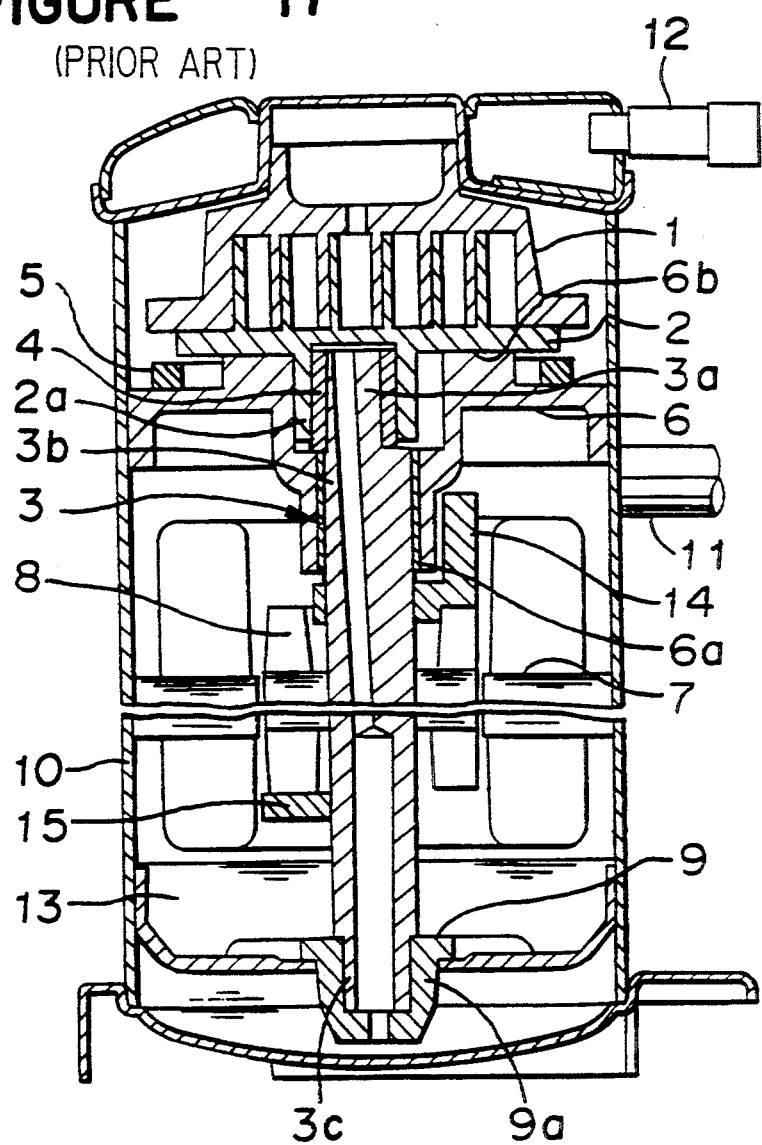
FIG. 17 is a longitudinal sectional view showing a conventional scroll type compressor.

The scroll type compressor according to the present invention will be described in detail, referring to embodiments shown in the accompanying drawings. In FIG. 1, there is shown the scroll type compressor 20 according to a first embodiment of the present invention. In FIG. 1 showing the scroll type compressor 20 of the first embodiment, similar or corresponding parts are indicated by the same reference numerals as the conventional scroll type compressor shown in FIG. 17, and explanation of those parts will be omitted for the sake of simplicity.

The scroll type compressor 20 of the embodiment includes a crankshaft 21 which has an electric motor rotor 8 fixed by shrinkage fit at an intermediate portion thereof in its axial direction. The crankshaft 21 has an upper portion formed integrally with an eccentric shaft portion 22 which is fitted into a bearing part 2a of an orbiting scroll 2 to give torque directly to the orbiting scroll 2. The crankshaft has a main shaft portion 23 formed thereon at a lower position than the eccentric shaft portion and a sub shaft portion 24 formed thereon at a lower end, the main shaft portion 23 being supported by a main shaft bearing 6a of a main frame 6, and the sub shaft portion 24 being supported by a sub bearing 9a of a sub frame 9. Bearing devices, i.e. bearing structures for supporting the eccentric shaft portion 22, the main shaft portion 23 and the sub shaft portion 24 formed on the crankshaft 21 will be explained one after another.

Figure 2:
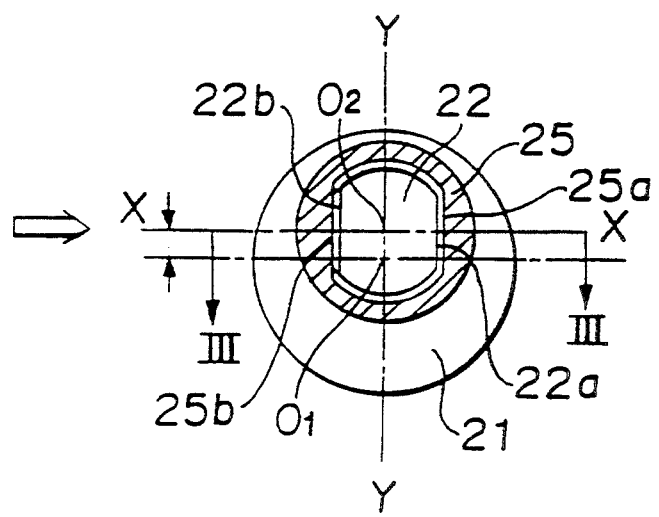
FIG. 2 is a top plan view showing an eccentric shaft portion on top of a crankshaft in the scroll type compressor of FIG. 1, the eccentric shaft portion having a driving bushing fitted thereon.
Figure 3:
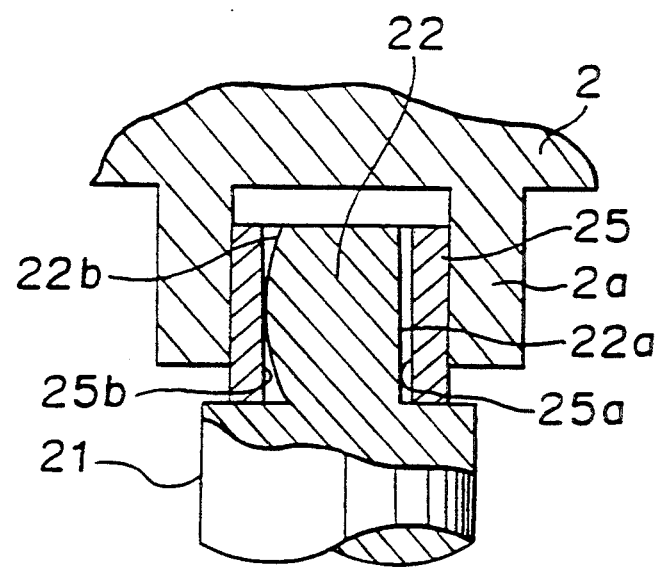
FIG. 3 is a sectional view taken along the line III—III of FIG. 2 wherein the driving bushing which is fitted thereon in the embodiment of FIG. 2 is mounted in a bearing part of an orbiting scroll.

In FIGS. 2 and 3, there are shown cross sectional views which schematically show a bearing structure of the eccentric shaft portion 22 formed on the upper end of the crankshaft 21 in the scroll type compressor 20 in accordance with the first embodiment. As can be clearly seen in FIG. 2, the eccentric shaft portion 22 has an external shape that is formed to be based on a circle whose center $O_2$ lies at a location shifted by a predetermined length with respect to the center $O_1$ of the crankshaft 21. When the line connecting the two centers $O_1$ and $O_2$ is defined as Y—Y, and a line perpendicular to the line Y—Y is defined as X—X, the eccentric shaft portion 22 has a flat surface 22a formed on a peripheral surface thereof in the direction along the line Y—Y. The eccentric shaft portion 22 also has a curved surface 22b formed on the peripheral surface at the side opposite the flat surface 22a, the curved surface 22b presenting a convex surface outwardly along an axial direction.

Figure 4:
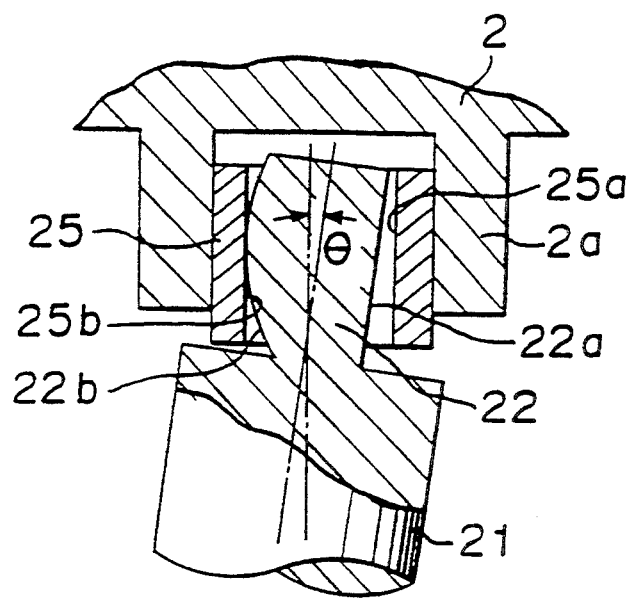
FIG. 4 is a cross sectional view showing a state wherein the crankshaft is inclined in a bearing structure of the crankshaft eccentric shaft portion according to the embodiment of FIG. 3.

On the other hand, the eccentric shaft portion 22 has a driving bushing 25 engaged thereon in such a manner that the driving bushing 25 is rotatably mounted in the bearing part 2a of the orbiting scroll 2. The driving bushing 25 has a bore formed therein to be engageable with the eccentric shaft portion 22. The inner peripheral surface of the bore is formed with flat surfaces 25a and 25b at locations which correspond to the flat surface 22a and the curved surface 22b of the eccentric shaft portion 22, respectively. The eccentric shaft portion 22 is put into the bore of the driving bushing 25 with a predetermined gap therebetween as shown in FIG. 3. Even if the eccentric shaft portion 22 is as shown in FIG. 4 when the eccentric shaft portion 22 having such a structure causes the orbiting scroll 2 to carry out an orbiting movement through the driving bushing 25, the driving bushing 25 can rotate with a parallel position to the bearing in the bearing part 2a of the orbiting scroll 2, without being inclined with the eccentric shaft portion 22. This is because the curved surface 22b is in touch with the corresponding flat surface 25b of the driving bushing 25 to be rotatable and movable in the axial direction. This arrangement can eliminate partial contact from occurring in the bearing part 2a of the orbiting scroll 2, prevent bearing performance from deteriorating, decrease wear and be free from seizure.

Figure 5:
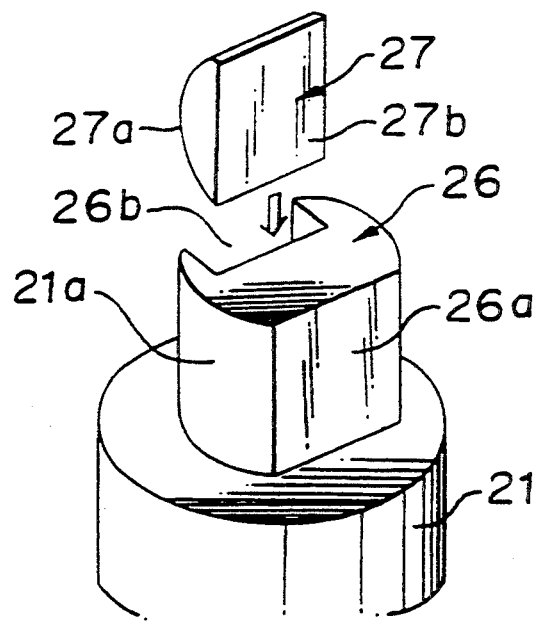
FIG. 5 is a perspective view showing another structure of the bearing for the crankshaft eccentric shaft portion.

Referring now to FIG. 5, there is shown a perspective view of another embodiment of the eccentric shaft portion which is formed on the top end of the crankshaft 21. In this embodiment, the eccentric shaft portion is indicated by reference numeral 26. The eccentric shaft portion 26 is basically similar to the eccentric shaft portion 22 shown in FIG. 2. The eccentric shaft portion 26 has an outer shape which is formed based on a circle with the center $O_2$. The center $O_2$ is shifted at a predetermined distance from the center $O_1$ of the crankshaft 21. The eccentric shaft portion 26 includes an eccentric pin 21a which has a flat surface 26a formed on a peripheral surface at a location which extends along the line connecting between the two centers $O_1$ and $O_2$. The eccentric pin 21a has the peripheral surface formed with a cutout 26b on the side opposite the flat surface 26a, the cutout being U-shaped as viewed from the top.

Into the cutout 26b is inserted a separate coupling member 27 from upward, the coupling member having a front end formed with a curved surface 27a and a rear end formed with a flat surface 27b as clearly shown in FIG. 5. The coupling member 27 has such a shape which is obtained by cutting off a part of the peripheral portion of a cylindrical body in its longitudinal direction. The coupling member 27 is mounted into the cutout 26b of the eccentric shaft portion 26 in such a manner that the curved surface 27a projects to be convex in an outward direction along the axial direction of the eccentric shaft portion 26. By this arrangement, the eccentric shaft portion 26 can have a substantially same structure as the eccentric shaft portion 22 shown in FIG. 2. A driving bushing which is identical to the one shown in FIG. 2 can be used to be engaged with the eccentric shaft portion 26, and explanation of the driving bushing for the eccentric shaft portion 26 will be omitted for the sake of simplicity.

Figure 6:
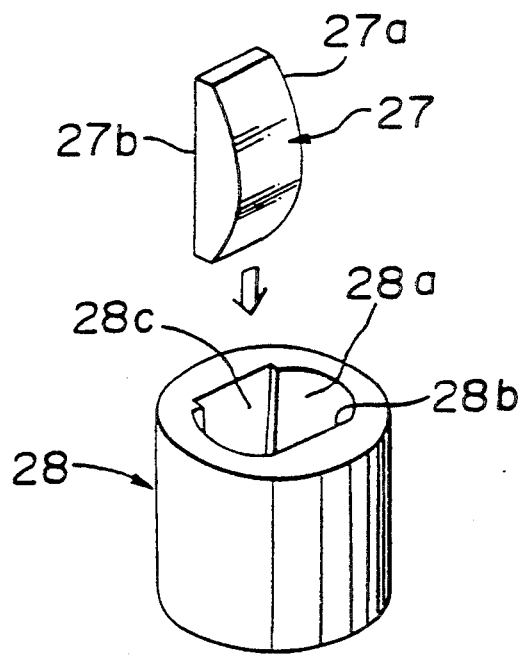
FIG. 6 is a perspective view showing another structure of the bearing for the crankshaft eccentric shaft portion.

Referring now to FIG. 6, there is shown another embodiment of the driving bushing which is mounted onto the eccentric shaft portion formed on the top of the crankshaft 21. The driving bushing of this embodiment is indicated by reference numeral 28. The driving bushing 28 has a bore 28a formed therein to be basically engageable with the basic circle of the eccentric shaft portion like the driving bushing 25 shown in FIG. 2. The bore 28a has a flat surface 28b and a cutout 28c formed on an inner peripheral surface thereof in such a manner that the flat surface 28b is perpendicular to a diametrical center line of the bore and the cutout 28c is opposite to the flat surface 28b. Into the cutout 28c is inserted a separate coupling member whose shape is identical to the coupling member 27 shown in FIG. 5. The coupling member 27 is mounted in such a manner that the curved surface 27a projects to be convex in an inward direction with respect to the axial direction of the driving bushing 28. When the driving bushing 28 is used, the eccentric shaft portion which has the driving bushing 28 engaged with and mounted to it is different from the eccentric shaft portion shown in FIG. 2 in that the outer peripheral surface on the side opposite one of the flat surfaces 22a is not curved but a flat surface. It means that the eccentric shaft portion and the driving bushing have such a relation that two couples of oppositely engaged portions are formed on the opposite peripheral surfaces (the outer peripheral surface of the eccentric shaft portion and the inner peripheral surface of the driving bushing) at locations along the line connecting between the center $O_1$ of the crankshaft and the center $O_2$ of the eccentric shaft portion, that one of the couples is constituted by flat surfaces (e.g. the flat surfaces 22a and 25a as shown in FIG. 2), and that either of the oppositely engaged surface portions in the other couple is constituted by a curved surface as stated above, and the other engaged surface portion is constituted by a flat surface.

When the separate coupling member 27 is prepared and is mounted into the cutout formed in the eccentric shaft portion or the driving bushing as shown in FIGS. 5 and 6, it is possible to eliminate difficulty which is involved by working in a direct and precise manner the curved surface which curves in a direction along the axis of the eccentric shaft portion outer peripheral surface of the crankshaft. It is also possible to eliminate similar difficulty with respect to the inner peripheral surface of the engaged bore of the driving bushing. In addition, such a solution can not only improve processability and processing precision but also decrease a processing cost. The concept of the curved surface which is formed on either of the one couple of oppositely engaged surface portions between the eccentric shaft portion and the driving bushing includes such an arrangement that the eccentric shaft portion has a groove 29 formed therein to be perpendicular to the axial direction thereof, and the groove 29 has a cylindrical roller 30 inserted therein.

Figure 7:
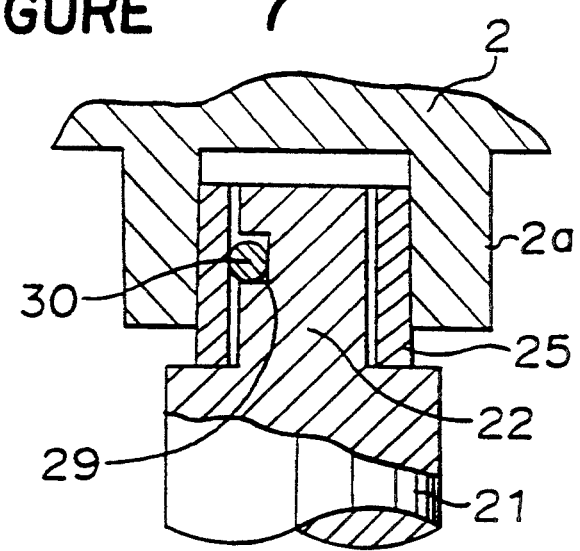
FIG. 7 is a cross sectional view showing another structure of the bearing for the crankshaft eccentric shaft portion.
Figure 8:
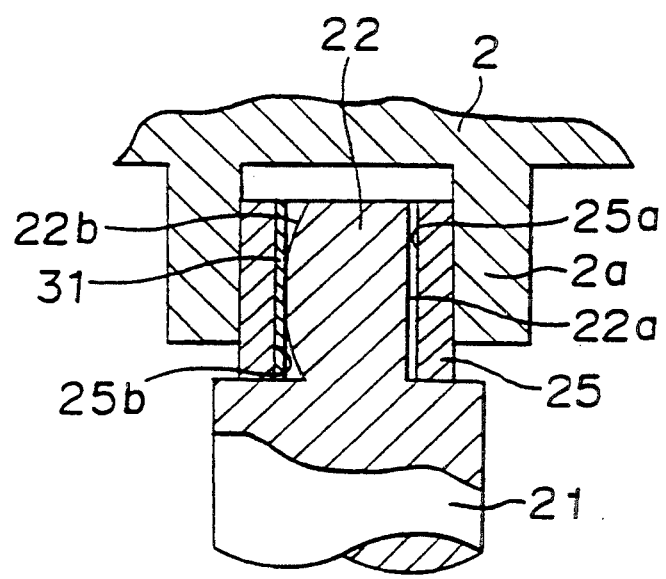
FIG. 8 is a cross sectional view showing another bearing structure of the crankshaft eccentric shaft portion.

In the case of FIG. 7, the cylindrical roller 30 which is a general purpose part can be used to remarkably improve processability, thereby allowing a processing cost to be lowered. As shown in FIG. 8, the other couple of oppositely engaged surface portions can have a highly hard member 31 such as a hardened steel arranged between the curved surface (e.g. the curved surface 22b of the eccentric shaft portion 22) and the corresponding flat portion (e.g. the flat surface 25b of the driving bushing 25) to ensure enough hardness on both contact portions. In this case, the driving bushing can be made from a material having relatively lower hardness, such as a sintered material. Such an arrangement can offer an advantage in that reliability is ensured while a processing cost is decreased.

Figure 9:
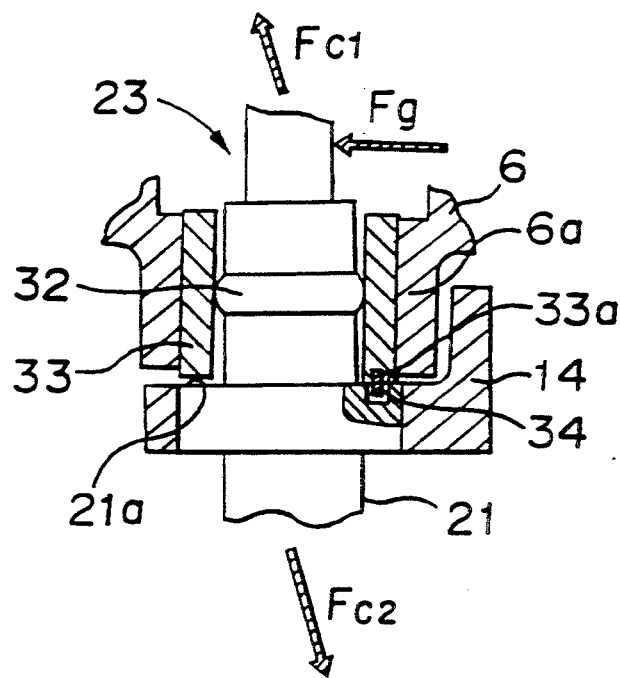
FIG. 9 is a cross sectional view showing a bearing structure for supporting a main shaft portion of the crankshaft in accordance with a second embodiment of the scroll type compressor.

Referring now to FIG. 9, there is shown a bearing structure which supports the main shaft portion 23 of the crankshaft 21 at the main bearing part 6a of the main frame 6 in the scroll type compressor 20. The main shaft portion 23 has a central portion provided with a barrel shaped band portion 32 to present a convex surface in the entire peripheral direction. The maximum projected portion which lies at the central portion of the barrel portion 32 has a cylindrical bushing 33 engaged on the periphery thereof with a minute gap. The cylindrical bushing 33 is seated on a seat surface 21a which is formed at a lower portion of the main shaft portion of the crankshaft 21.

The cylindrical bushing 33 is rotatably within the main bearing part 6a of the main frame 6, and rotates together with the crankshaft 21. To accomplish this, a bottom surface 33a of the cylindrical bushing and the seat surface 21a are formed with holes in the axial direction, and a connecting pin 34 is press fit into each of the holes. This arrangement allows the cylindrical bushing 33 to rotate together with the crankshaft 21. Either of the holes which the connecting pin 34 is press fit into is formed as an elongated hole which is elongated in a radial direction because the crankshaft 21 is inclined with respect to the cylindrical bushing 33 when the crankshaft 21 receives a compressive load $F_g$. Although in the case of FIG. 9 the hole which is formed in the sheet surface 21a is elongated, the hole which is formed in the bottom surface 33a of the cylindrical bushing 33 may be elongated.

In accordance with the bearing structure which is constituted by the main shaft portion 23 of the crankshaft 21 having the central portion provided with the barrel shaped band portion to present the convex surface in the entire peripheral direction, and the cylndrical bushing 33 arranged in the main bearing part 6a of the main frame 6, the contacting points between the curved surface on the band portion 32 of the main shaft portion 23 and the cylindrical bushing 33 can move following a flexing direction and a flexing magnitude of the crankshaft 21 though the compressive load $F_g$ and centrifugal loads $F_{C1}$, $F_{C2}$ and $F_{C3}$ which are applied on the crankshaft 21 are substantially rectangular in their directions, and their magnitudes vary depending on the operating conditions of the compressor to change the flexing direction of the crankshaft 21. Irrespectively of the operating conditions of the compressor, the cylindrical bushing 33 can rotate while constantly maintaining a parallel state to the main bearing part 6a of the main frame 6 (maintaining such a state that the central rotating axis of the cylindrical bushing 33 corresponds to the central axis of the main bearing part 6a).

Such an arrangement can offer a highly reliable bearing structure which prevents a bearing load carrying capacity from falling and is free of wear, seizure or the like in the bearing.

By the way, when the cylindrical bushing 33 has moved its contacting point on the curved surface of the band portion on the main shaft portion 23 of the crankshaft 21, a gap is apt to be formed between the sheet surface 21a and the bottom surface 33a of the cylindrical bushing 33. However, the gap can be minimized by selecting suitable curvature of the curved surface of the band portion 32. In this manner, an oil for lubricating the cylindrical bushing 33 can be prevented from flowing out of the gap.

Figure 10:
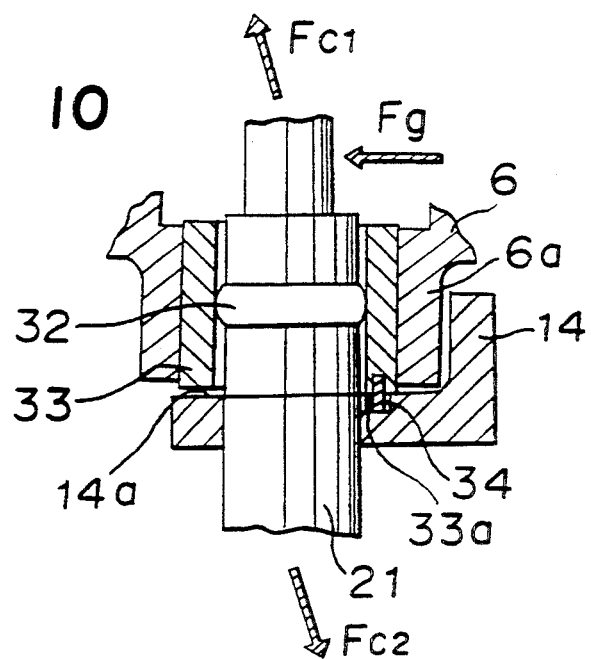
FIG. 10 is a cross sectional view showing another structure of the bearing for the crankshaft main shaft portion.

Although in the bearing structure of the crankshaft main shaft portion 23 stated above, the seat surface 21a to the cylindrical bushing 33 is formed on the crankshaft 21, the seat surface may be an upper surface 14a of an upper balance weight 14 as shown in FIG. 10. In this case, the crankshaft 21 can have the outer diameter formed in a size smaller than the main shaft portion outer diameter throughout its entire length, thereby improving machinability of the crankshaft.

Figure 11:
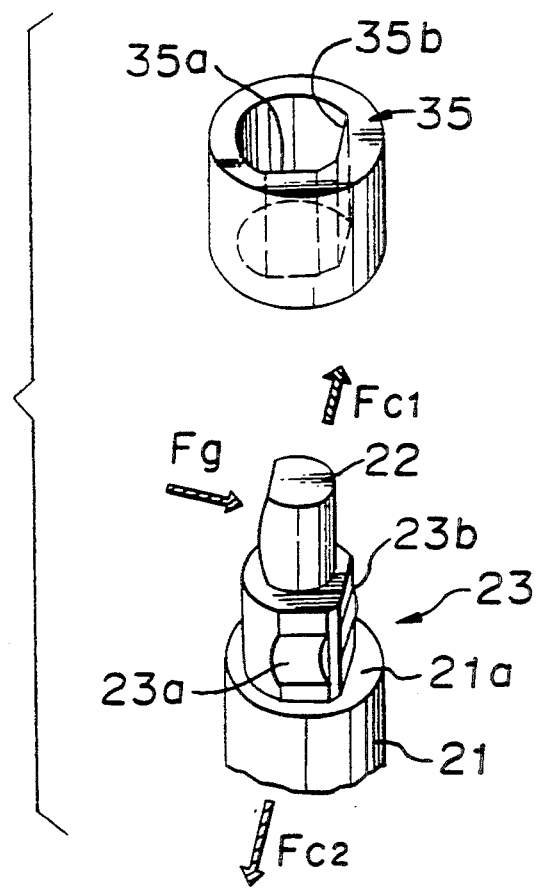
FIG. 11 is an exploded and perspective view showing another structure of the bearing for the crankshaft main shaft portion.
Figure 18:
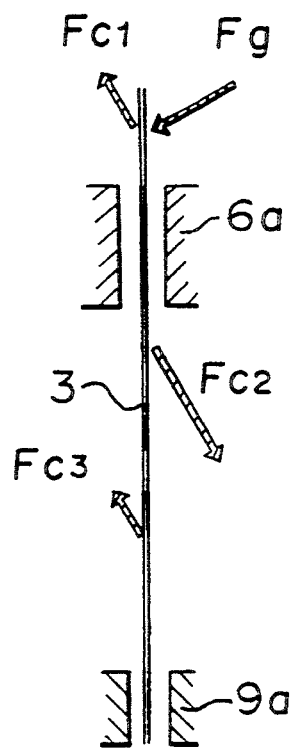
FIG. 18 is a schematic view showing the directions of compressive loads and centrifugal forces of balance weights which are exerted on a crankshaft in the conventional scroll type compressor.
Figure 19:
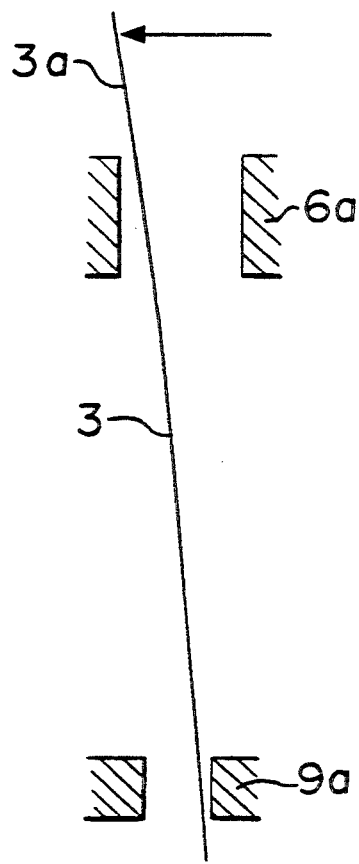
FIG. 19 is a schematic view showing how the crankshaft is inclined in the conventional scroll type compressor.

As shown in FIG. 11, the main shaft portion 23 of the crankshaft 21 may be formed in such a manner that two surfaces which are located in a reactive force direction of the compressive load direction $F_g$ and in a reactive force direction of centrifugal loads $F_{C1}$, $F_{C2}$ and $F_{C3}$ ($F_{C3}$ is not shown in FIG. 11 but is understood to be the same as shown in FIG. 18) have curved surfaces 23a and 23b formed on central portions thereof to present convex surfaces, that a cylindrical bushing 35 which has flat surfaces 35a and 35b formed on the inner peripheral surface thereof at locations corresponding to the curved surfaces 23a and 23b, and that the main shaft portion 23 has the cylindrical bushing 35 engaged therewith. Such an arrangement allows the cylindrical bushing 35 to follow flexure-deformation of the crankshaft 21 due to the compressive load $F_g$, and the centrifugal loads $F_{C1}$, $F_{C2}$ and $F_{C3}$, and to move its contacting points on the curved surfaces 23a and 23b of the main shaft portion 23 of the crankshaft 21. As a result, the cylindrical bushing can be rotated, maintaining a parallel state to the main bearing part 6a of the main frame 6, and can offer an advantage similar to the bearing structure stated above. In this case, the two curved surfaces 23a and 23b can also work to connect the crankshaft 21 and the cylindrical bushing 35 in a circumferential direction to need no connecting pin.

Figure 12:
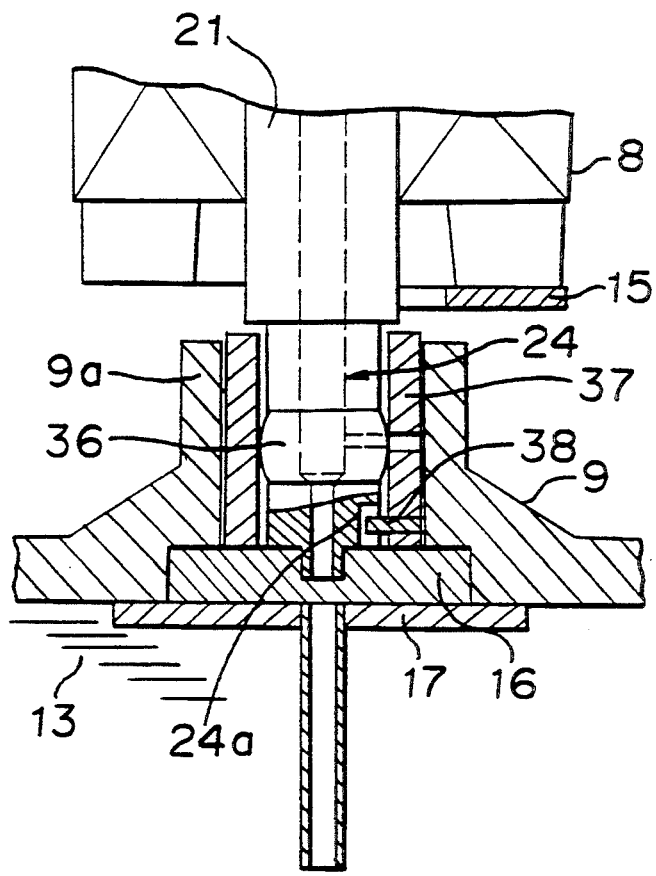
FIG. 12 is a cross sectional view showing a bearing structure for supporting the crankshaft sub bearing portion in accordance with another embodiment of the scroll type compressor.

Referring now to FIG. 12, there is shown a bearing structure which supports the crankshaft 21 by a sub bearing part 9a in a sub frame 9 in a scroll type compressor 20. In the bearing structure, a sub shaft portion 24 of the crankshaft 21 has a central portion provided with a barrel shaped band portion 36 to present a convex surface like the bearing structure for supporting the main shaft portion 23 of the crankshaft 21 in the main bearing part 6a of the main frame 6 stated above. The bearing structure is constituted by engaging a cylindrical bushing 37 with the sub shaft portion 24 with a minute gap around the outer circumference of the band portion.

In order that the cylindrical bushing 37 can rotate with the crankshaft 21 as one unit, a connecting pin 38 has one end press fit into a hole formed in the cylindrical bushing in a radial direction, and has the other end engaged in an elongated hole 24a which is formed in the crankshaft 21 to be long in the axial direction. In this manner, the cylindrical bushing and the crankshaft are interconnected in the circumferential direction. In FIGS. 1 and 12, reference numeral 16 designates an oil supply pump, and reference numeral 17 designates a cover for the oil supply pump.

Figure 13:
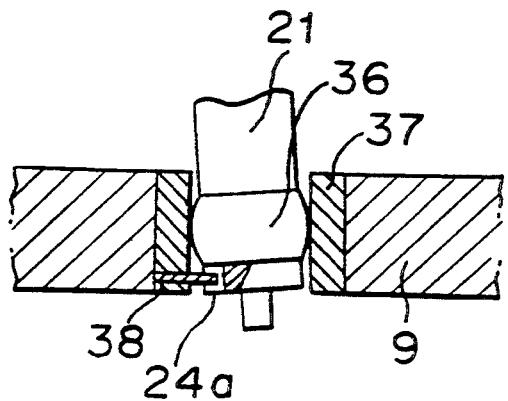
FIG. 13 is a cross sectional view schematically showing a state wherein the crankshaft is inclined in the bearing structure of the crankshaft sub shaft part of FIG. 12.

In accordance with such an bearing structure wherein the sub shaft portion 24 of the crankshaft 21 is supported by the sub bearing part 9a in the sub frame 9, when the crankshaft 21 has flexure-deformation caused therein as shown in FIG. 13, the contacting points between the sub shaft portion 24 of the crankshaft 21 and the cylindrical bushing 37 arranged around the outer circumference of the sub shaft portion 24 moves on the barrel shaped band portion which presents the convex surface in the central portion of the sub shaft portion 24. As a result, the cylindrical bushing 37 can rotate while maintaining a parallel state to a boss of the sub frame 9, i.e. the sub bearing part 9a. Such an arrangement can prevent a bearing load carrying capacity from lowering, and offer a highly reliable bearing structure which is free from wear, seizure or the like in the bearing.

Figure 14:
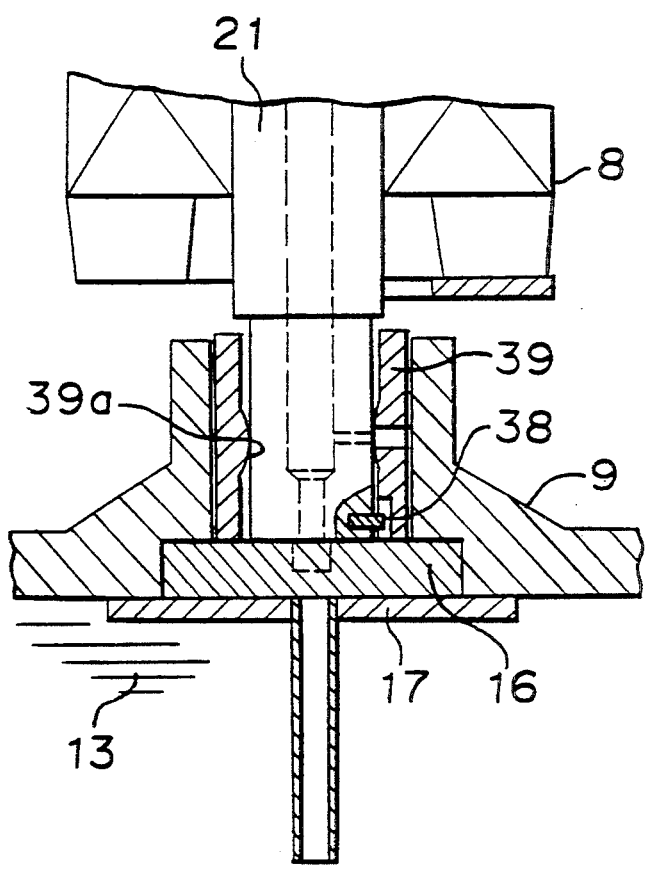
FIG. 14 is a cross sectional view showing another structure of the bearing for the crankshaft sub shaft portion.

Although in the bearing structure for supporting the sub shaft portion 24 of the crankshaft 21 stated above, the sub shaft portion 24 of the crankshaft 21 has the central portion provided with the barrel shaped band portion 36 to present the convex surface, and the cylindrical bushing 37 is engaged on the outer circumference of the band portion 36, the bearing structure may be constituted by a cylindrical bushing 39 whose inner peripheral surface has a central portion provided with a barrel shaped band portion 39a to present a convex surface, and which is engaged with the crankshaft 21 as shown in FIG. 14.

Although the connecting pin 38 which have the one end press fit into the hole in the cylindrical bushing 37 is engaged in the elongated hole 24a formed in the crankshaft 21 to offer a connecting mechanism for the crankshaft 21 and the cylindrical bushing 37 in their rotary direction in the embodiment described earlier, such an arrangement wherein an elongated hole is formed in the cylindrical bushing 39, a hole is formed in the sub shaft portion 24 of the crankshaft 21, and the connecting pin 38 has one end press fit into the hole in the sub shaft portion 24 and the other end engaged in the elongated hole may be adopted.

Figure 15:
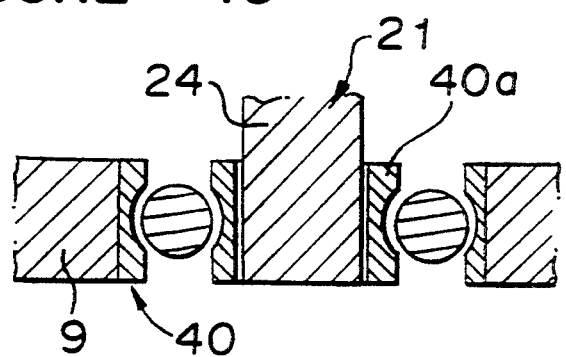
FIG. 15 is a cross sectional view showing another structure of the bearing for the crankshaft sub shaft portion.

Although in the bearing structure for supporting the sub shaft portion 24 of the crankshaft 21 as stated earlier, the sub shaft portion 24 or the cylindrical bushing 39 has the central portion provided with the barrel shaped band portion to present the convex surface, the sub shaft portion 24 of the crankshaft 21 may be supported by the sub bearing part 9a by use of a rolling bearing as shown in FIG. 15 because a compressive load and a centrifugal load which are applied on the sub bearing part 9a of the sub frame 9 are generally smaller than those applied to the eccentric shaft portion 22 and the main shaft portion 23. When the rolling bearing 40 (deep groove ball bearing in FIG. 15) is used, an inner ring 40a is mounted to the crankshaft 21 by clearance fit because the scroll type compressor is subjected to a load fixed to an inner ring (a load direction rotates, the inner ring rotates and an outer ring is standstill).

Figure 16:
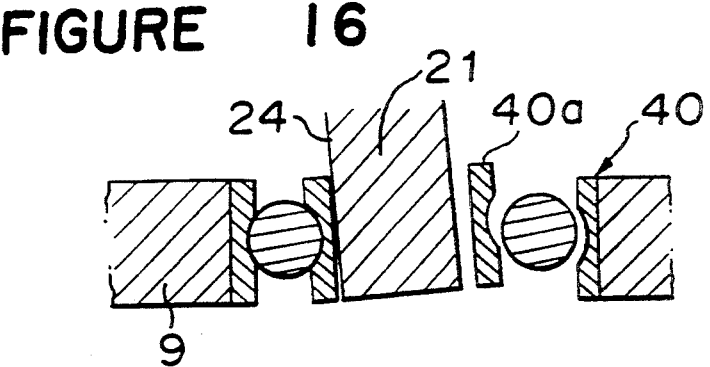
FIG. 16 is a cross sectional view schematically showing a state wherein the crankshaft is inclined in the bearing structure of the crankshaft sub shaft portion of FIG. 15.

When a load is applied to the crankshaft 21 in a bearing structure for supporting the shaft portion 24 of the crankshaft 21 by means of the rolling bearing 40, the inner ring 40a is inclined with respect to a load direction as shown in FIG. 16 to follow the inclination of the crankshaft 21. The inclination of the crankshaft 21 does not damage a load carrying capacity or reliability of the rolling bearing 40. Even if the crankshaft 21 is inclined, a load carrying capacity or reliability of the bearing is prevented from lowering.

Although in the scroll type compressor according to the embodiment shown in FIG. 1, the bearing structure for supporting the eccentric shaft portion 22, the main shaft portion 23 and the sub shaft portion 24 of the crankshaft 21 are constituted by arranging the driving bushing 25 or the cylindrical bushing 33 or 37, and forming the bearing surfaces of the respective shaft portions in such convex curved surfaces that the respective bearing surfaces work as parallel bearings to the respective bushing, at least one of the eccentric shaft portion, the main shaft portion and the shaft portion of the crankshaft 21 can be supported by the bearing structure stated above to prevent a bearing load carrying capacity in the shaft portion from lowering.

We claim:

1. A scroll type compressor comprising:
 a main frame;
 sub frame;
 a main frame bushing and a sub frame bushing rotatably mounted in said main frame and said sub frame;
 a crankshaft rotatably mounted in said main frame and said sub frame via said main frame bushing and said sub frame bushing, said crankshaft having an eccentric shaft portion formed thereon, wherein the main frame and sub frame are mutually spaced along the axis of the crankshaft;
 a fixed scroll;
 an orbiting scroll cooperable with the fixed scroll to compress gas, said orbiting scroll being drivingly mounted on said eccentric shaft portion;
 an electric motor mounted between said main frame and said sub frame and having a rotor coupled to said crankshaft for driving said crankshaft;
 upper and lower balance weights placed at opposite ends of said rotor for balancing orbiting movement of said orbiting scroll;
 a pin connected between said sub frame bushing and the crankshaft for rotatably coupling the sub frame bushing to the crankshaft; and
 a barrel shaped band portion presenting a convex surface in at least one of a respective force direction of a compressive load generated in a compression chamber formed between the orbiting scroll and the fixed scroll, and a reactive force direction of a centrifugal load generated by a revolution movement of the orbiting scroll and rotary movements of the upper and lower balance weights, the barrel shaped band portion facing the crankshaft and being formed on said sub frame bushing.

* * * * *